(12) United States Patent
Diekhans et al.

(10) Patent No.: US 7,502,678 B2
(45) Date of Patent: Mar. 10, 2009

(54) METHOD FOR CONTROLLING AN AGRICULTURAL MACHINE SYSTEM

(75) Inventors: Norbert Diekhans, Guetersloh (DE); Andreas Brunnert, Rietberg (DE); Lars Peter Meyer Zu Helligen, Spenge (DE); Gerhard Nienaber, Ennigerloh (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 159 days.

(21) Appl. No.: 11/737,565

(22) Filed: Apr. 19, 2007

(65) Prior Publication Data
US 2007/0255470 A1 Nov. 1, 2007

(30) Foreign Application Priority Data
Apr. 21, 2006 (DE) .................. 10 2006 019 216

(51) Int. Cl.
*G06F 19/00* (2006.01)
*G06F 7/70* (2006.01)
(52) U.S. Cl. ................. 701/50; 701/23; 701/26; 340/988; 172/4.5
(58) Field of Classification Search .......... 701/23, 701/25, 26, 50, 200, 201, 207, 209; 342/357.13, 342/457; 340/988, 994
See application file for complete search history.

(56) References Cited

U.S. PATENT DOCUMENTS

| | | | |
|---|---|---|---|
| 5,646,844 A * | 7/1997 | Gudat et al. ............. 701/208 |
| 5,897,595 A * | 4/1999 | Hawkins et al. .......... 701/23 |
| 5,906,646 A * | 5/1999 | Kemner ................... 701/23 |
| 5,931,875 A * | 8/1999 | Kemner et al. ........... 701/23 |
| 6,095,254 A | 8/2000 | Homburg |
| 6,128,574 A | 10/2000 | Diekhans |
| 6,205,381 B1 * | 3/2001 | Motz et al. .............. 701/25 |
| 6,681,551 B1 | 1/2004 | Sheidler et al. |
| 6,741,921 B2 * | 5/2004 | Cohen et al. ............ 701/50 |
| 6,799,100 B2 * | 9/2004 | Burns et al. ............. 701/25 |
| 6,990,399 B2 | 1/2006 | Hrazdera et al. |
| 2005/0273253 A1 | 12/2005 | Diekhans et al. |
| 2005/0284119 A1 | 12/2005 | Brunnert |

FOREIGN PATENT DOCUMENTS

| | | |
|---|---|---|
| DE | 197 43 884 | 4/1999 |
| DE | 102 50 694 | 2/2004 |
| DE | 10 2004 027 242 | 12/2005 |
| DE | 10 2004 031 211 | 2/2006 |
| EP | 0 821 296 | 1/1998 |
| EP | 1 380 202 | 1/2004 |

* cited by examiner

*Primary Examiner*—Gertrude Arthur Jeanglaud
(74) *Attorney, Agent, or Firm*—Michael J. Striker

(57) ABSTRACT

For controlling an agricultural machine system while it works a territory, which a route (R) is created for the machine system, which includes working tracks ($F_N$) along which the machine system is driven while the territory (S) is being worked, and which includes headland tracks ($F_V$), along which the machine system is driven when it travels from one working track ($F_N$) to the next working track ($F_N$) to be driven along. The machine system automatically processes a sequence of headland working steps at the end of one working track ($F_N$) and/or while a subsequent headland track ($F_V$) is being driven along, and/or at the beginning of a subsequent working track ($F_N$). The sequence of headland working steps is updated and carried out dynamically depending on the current position of the machine system and depending on the next working track ($F_N$) to be driven along. A related automatic control system for controlling an agricultural machine system is also provided.

10 Claims, 6 Drawing Sheets

METHOD FOR CONTROLLING AN AGRICULTURAL MACHINE SYSTEM

CROSS-REFERENCE TO A RELATED APPLICATION

The invention described and claimed hereinbelow is also described in German Patent Application DE 10 2006 019 216.8 filed on Apr. 21, 2006. This German Patent Application, whose subject matter is incorporated here by reference, provides the basis for a claim of priority of invention under 35 U.S.C. 119(a)-(d).

BACKGROUND OF THE INVENTION

The present invention relates to a method for controlling an agricultural machine system while it works a territory, with which a route is created for the machine system.

The route includes working tracks along which the machine system is driven to work the territory, and it includes headland tracks, along which the machine system is driven when it travels from one working track to the next working track. The machine system automatically carries out a sequence of headland working steps at the end of a working track and/or while a subsequent headland track is being driven along and/or at the beginning of a subsequent working track.

The present invention also relates to an automatic control system for controlling an agricultural machine system on a territory to be worked, with which a method of this type can be carried out.

Given that the performance of agricultural machine systems, i.e., working vehicles such as combine harvesters, forage harvesters or tractors with various attachments such as fertilizer spreaders, sowing machines, spraying devices, impellers, swathers, etc., has increased continually, the planning of the working steps has also grown in significance in recent years. For specific applications, harvesting in particular, the amount of time available for performing work is usually limited, usually due to the weather, and this time is often not used in an optimal manner due to lack of resource planning.

Precise resource planning is also important in order to attain the theoretically maximum possible performance of the machines in practical application. To reach this goal of optimal resource utilization, route planning systems and route planning methods were developed, which are used to determine an optimized route for working the territory, e.g., a certain field, for the particular machine system. The particular machine system can then be driven along this route—depending on the configuration of the machine system—either fully automatically, i.e., using automatic steering, semi-automatically, or simply manually with support from a suitable display device, which the driver uses to keep the vehicle on a virtual driving line.

Route planning systems of this type and automatic steering systems typically function using satellite-based navigation devices, e.g., GPS receivers (GPS=Global Positioning System). Various correction procedures are used to improve accuracy, such as DGPS (differential GPS) for a GPS method. An example of a route planning system of this type is described in EP 0 821 296 B1. As explained above, a planned route of this type typically includes the planned paths on the field to be worked, i.e., the individual "working tracks" on the field, as well as the driving courses for turning maneuvers in the headland areas, in order to travel from one working track to another working track that is usually directly adjacent thereto or is parallel thereto but offset at a distance.

The methods and route planning systems described above greatly simplify the work to be carried out by the operator of the agricultural machine system, since these devices and methods relieve him of the task of driving along long subpaths. However, the operator of the machine system must monitor and control a large number of functions during the turning operation, i.e., particularly when exiting one working track and entering a new working track. When exiting one working track, for example, the ground-working device usually must be raised, the vehicle must be shifted into a different gear, and the speed must be changed. When entering the new working track, the vehicle must be shifted into the correct gear, the speed must be adjusted, and the ground-working device must be lowered.

The working procedure—which often appears to be relatively simple when viewed from the outside—is actually composed of a large number of individual working steps. For example, an entire sequence of working steps to be carried out within a turning maneuver—referred to here as a "sequence of headland working steps"—can be broken down for a tractor with a drill combination of front packer, spinning body, harrow and drill machine into the following individual working steps:
1. Retract the front-mounted lifting means.
2. Retract the rear-mounted lifting means.
3. Turn off the P.T.O shaft.
4. Retract the track display.
5. Turn off the differential lock.
6. Deactivate the throttle.
7. Downshift.

Then, the actual turning procedure takes place. When the next working track is entered, the following individual working steps must be carried out:
1. Lower the rear-mounted lifting means.
2. Turn on the P.T.O shaft.
3. Activate the throttle.
4. Lower the front-mounted lifting means.
5. Lower the track display.
6. Upshift.
7. Turn on the differential lock.

This example alone shows that a turning procedure of this type requires a great deal of practice and the driver's full concentration. To relieve the driver of this task to the greatest extent possible, "headland management systems" (also referred to as "field-end management systems") were developed and have been on the market for a few years. Using headland management systems of this type—some of which can also be retrofitted for tractors and other agricultural machine systems—sequences of headland working steps can be controlled automatically. To this end, various sequences of headland working steps can typically be "learned". The operator switches the headland management system into a learning mode and carries out a turning maneuver, during which the individual working steps are registered and stored by the headland management system.

One problem with these systems, however, is that they are controlled solely in a time-dependent manner or—as with the automatic control system described in EP 1 380 202 B1—in a solely path-dependent manner. With purely time-dependent control, the sequence of working steps is "mirrored" in terms of time exactly the way it was recorded in the learning mode. This means the machine system must always perform the entire turning maneuver in the same amount of time. With path-dependent control, the stored operations are always carried out after the same distances that were covered when they were learned, regardless of whether the machine system moves at the same speed, or at a slower or faster speed than in the learning mode.

Both methods can be used effectively when the turning maneuvers between two working tracks are always the same, i.e., when the headland tracks to be driven are always the same. It cannot be assumed, however, that the optimal route for working a field means that the headland tracks between the individual working tracks are always the same. For example, it can be highly advantageous to choose a working strategy with which the sequence of working tracks to be traveled on the field does not require that the path length between the working tracks always be the same. If there are obstacles in the headland area, it may not be possible to travel along the headland track as planned.

Any considerable change to the headland track means that the sequences of headland working steps stored in the headland management system no longer match the headland track to be driven along and can therefore not be used without risking errors or, in the worst case, accidents. This means it is not possible to select an optimal route independently of the sequence of headland working steps that was stored and to travel along it fully automatically.

SUMMARY OF THE INVENTION

An object of the present invention, therefore, is to provide a method for controlling an agricultural machine system of the type described initially and to create an automatic control system for carrying out this method, with which the disadvantages described above are prevented.

In keeping with these objects and with others which will become apparent hereinafter, one feature of the present invention resides, briefly stated, in A method for controlling an agricultural machine system while it works a territory (S), comprising the steps of creating a route (R) for the machine system, which includes working tracks ($F_N$) along which the machine system (1) is driven while the territory (S) is being worked, and which includes headland tracks ($F_V$), along which the machine system (1) is driven when it travels from one working track ($F_N$) to the next working track ($F_N$); automatically processing by the machine system a sequence of headland working steps at the end of one working track ($F_N$) and/or while a subsequent headland track ($F_V$) is being driven along, and/or at the beginning of a subsequent working track ($F_N$); and updating and carrying out dynamically the sequence of headland working steps depending on the current position of the machine system (1) and depending on the next working track ($F_N$) to be driven along.

Another feature of the present invention resides, briefly stated, in an automatic control system for controlling an agricultural machine system on a territory (S) to be worked, comprising a position data determination device for automatically detecting current position data (PD) about the machine system, a route planning system for creating a route (R) for the machine system, which includes working tracks ($F_N$) along which the machine system is driven while the territory (S) is being worked, and which includes headland tracks ($F_V$), along which the machine system is driven when it travels from one working track ($F_N$) to the next working track ($F_N$), a headland management system (5) which controls the machine system such that a sequence of headland working steps is carried out automatically at the end of a working track ($F_N$) and/or while a subsequent headland track ($F_V$) is being driven along, and/or at the beginning of a subsequent driving track ($F_N$); the headland management system is designed such that the sequence of headland working steps is updated and carried out dynamically depending on the current position of the machine system and depending on the next working track ($F_N$) to be driven along.

With the inventive control method provided, the sequence of headland working steps is updated and carried out dynamically depending on the current position of the machine system and depending on the next working track to be driven along—its standpoint and direction in particular—that is, after an update is performed, the remaining headland working steps are carried out in accordance with the updated sequence of working steps.

Using the inventive method, it can now be ensured that—independently of what the headland track ultimately looks like—the sequence of headland working steps is always synchronized with this headland track and therefore takes place correctly. The complete sequence of headland working steps can be controlled partially in a time-dependent manner, and partially in a path-dependent manner. It can be defined, for example, that a certain working step must be carried out at exactly one certain position or at a certain distance after the "old" working track is exited, or before the "new" working track is entered. It can also be defined that a certain working step should last for a certain length of time. This is important insofar as various functions are triggered on a tractor, e.g., using the same hydraulic valves, depending on which attachment is attached via a hydraulic connection of this hydraulic valve.

The various functions typically last for an exactly defined period of time. In order to carry out a certain function, it must therefore be ensured that the hydraulic valve is actuated for a certain length of time when a certain attachment is attached. A time-dependent control of this type can also be updated dynamically, and it can be dependent on which working steps have been carried out previously or afterward. The oil pressure in the hydraulic lines is higher, e.g., if the engine speed was increased before the particular working step. An attachment can then be hydraulically displaced more quickly, and the period of time for actuating the hydraulic valve can therefore be shorter than it is when the engine speed is not increased until after the particular time-controlled working step, for instance.

When the sequence of headland working steps is updated, it can be noted, in particular, how much more time the machine system requires to travel from the current position to the entry point of the next working track to be driven along, and how many working steps still need to be carried out. Working steps can be reordered or eliminated entirely, as necessary. With an originally planned sequence of headland working steps, it can be provided, for example, that, when the machine system exits a working track, the engine speed is reduced and then the header is lifted, and, before the machine system enters the new working track, the header is lowered, then the engine speed is increased.

If, in reality, the headland track is shorter than planned and there is therefore not as much time available as required for the originally planned sequence of headland working steps, the sequence can be updated as follows: First, the header is lowered, then the engine speed is reduced when the machine system exits the old working track, and, vice versa, when the machine system enters the new working track, the engine speed is increased, then the header is lowered. The advantage of this is that, due to the higher engine speed, the oil pressure is higher when the height of the header is adjusted, thereby enabling the header to be adjusted more quickly. If there is only a very short amount of time available for turning, the sequence of headland working steps can also be updated such that the engine speed is not reduced at all, and the only tasks carried out are that the header is lifted and then lowered.

The sequence of headland working steps can even be updated when the machine system is still located in the previous working track and a need for a change results due to replanning of the headland track, e.g., because a different subsequent working track was selected. It is also possible for the update to take place at any time while the headland track is being driven along, in order to adapt appropriately when the operator exits the intended headland track, e.g., in order to avoid obstacles or because the machine system slid in mud, and the planned turning time can therefore not be maintained.

Due to the inventive control method it is possible—nearly independently of the sequence of headland working steps originally planned, e.g., learned, by the headland management system—to plan an optimal route for the machine system and to travel along it fully automatically. Even when unplanned events occur, it is usually possible to carry out the sequence of headland working steps fully automatically without driver intervention.

The following components are required for an automatic control system for controlling an agricultural machine system according to the method described above:

- A position data determination device for automatically registering current position data about the machine system;
- A route planning system for creating a route for the machine system. This route planning system can be integrated in the machine system itself, e.g., in the form of software on a processor of the control device of the machine system. It can also be an external route planning system, e.g., loaded on a farm-based computer. The planned routes are then transmitted to a control device of the machine system using data media or by radio. This route contains the working tracks to be driven along by the machine system either fully automatically, semi-automatically, or manually, as it works the territory. The route can also contain preplanned headland tracks, along which the machine system is driven, from one working track to a subsequent working track;
- A headland management system, which controls the machine system such that, at the end of a working track and/or while a subsequent headland track is being driven along, and/or at the beginning of a subsequent driving track, a sequence of headland working steps is carried out automatically. The headland management system is designed according to the present invention such that the sequence of headland working steps is updated and carried out dynamically depending on the current position of the machine system and depending on the next working track to be driven along.

It is clear that an automatic control system of this type also includes related possibilities for storing the planned routes, particularly for the planned working tracks and the headland tracks, and for the planned and updated sequences of headland working steps.

With a particularly preferred exemplary embodiment, a headland track between the working track currently being driven along and the next working track to be driven along is determined—depending on the working track that is currently being driven along, the next working track to be driven along, the geographic data on a headland area, and depending on certain machine parameters of the agricultural machine system—in manner such that the machine system merges into the next working track to be driven along in an optimal manner. The geographic data on the headland area include, e.g., information about the dimensions and the position of the available headland area itself that results, e.g., when a field is harvested, from the shape of the outer edge of the field and the shape of the crop edge between the end point of the working track currently being driven along and the starting point of the next working track to be driven along. It can also include information (dimensions and position) about obstacles, safety zones, etc., that the vehicle must avoid. The primary machine parameters are the working width and/or the turning radius of the machine system. Other machine parameters can also be taken into account, particularly when they can be essential to a merging procedure.

Preferably, while the headland track is being driven along, the headland track itself is also updated dynamically depending on the current position of the machine system. That is, if the driver must avoid an unknown obstacle, for example, or if the vehicle slips in a muddy or sloped area, a new headland track is automatically calculated starting at the particular position and extending to the entrance of the next working track to be driven along, thereby ensuring that the machine system merges into the next working track in an optimal manner.

The control method therefore ultimately functions independently of which working tracks are entered in succession. As such, it is always possible—as it is with most classical working strategies—to select the closest adjacent driving track. It is also possible to enter any other optimal driving track that was selected within the framework of route planning. In particular, it is also possible at any time for the driver to specify which driving track he wants to enter next, e.g., a driving track with special properties or a driving track on which stored crop material can be unloaded, or a driving track with a certain crop quality. The driver can also select a certain driving track with a path marking that was put in place in advance. Via the dynamic updating of the headland track, the driver can select a different driving track—while driving along a track ahead of it or while driving along the planned headland track—thereby enabling him to react flexibly to any event and subsequently continue driving down a newly calculated, optimized route.

Particularly preferably, when the route for the machine system is created, the selection and layout of the working tracks and the sequence in which the working tracks will be driven along are carried out depending on certain parameters of the machine system, particularly its working width and/or turning radius. Particularly preferably, the working tracks are selected and laid out, and their sequence is selected depending on the course of possible headland tracks between the working tracks. By linking the optimization of the working tracks for working the territory with possible headland tracks in this manner it can be ensured that the working tracks per se as well as the time and distances required to travel along the headland tracks are taken into account in the route planning. Due to this intelligent planning of the turning maneuver, efficiency can be increased considerably. As described above, during travel along a working track, the sequence in which subsequent working tracks will be driven along is updated dynamically. For example, when it becomes clear that the grain tank of a combine harvester is full and must be unloaded, the sequence of working tracks to be driven along must be reordered such that it is possible to unload the grain tank on the next working track.

A headland track between two driving tracks can be generated preferably relatively easily using individual turning curves, each of which is defined by the following parameters:

- A turning curve center;
- A turning radius, with which, e.g., the minimum possible turning radius of the machine system is assumed;

A radian measure, which can be defined, e.g., by a start value and an end value, and by an angular direction or a start value and an angular difference calculated based on a start value and an end value;

A direction of travel along the turning curve;

Information about subsequent turning curves (including the straight intermediate paths that connect the turning curves).

To define an entire headland track, the turn start point and the turn end point—with orientation, i.e, the direction of travel—are also required. The next step is to combine the individual turning curves—from the turn start point to the turn end point—with the intermediate paths, in order to generate the entire headland track.

For the turning maneuver, it is possible to realize a turning maneuver planning module, preferably in the form of a software module, e.g., in the control device. In order for this turning maneuver planning module to generate a headland track based on the method described above, it requires at least the following parameters at one data input:

Turn start point with track end orientation;
Turn end point with track end orientation;
Minimum possible turning radius of the machine system that can be driven along automatically;
Shape of the field edge between the turn start point and the turn end point;
Shape of the outer edge of the field.

In addition, data on possible obstacles and the necessary safety margins must be provided to the turning maneuver planning module. The turning maneuver planning module can then output the data described above to generate the turning curves and the direction of travel of the machine system. These data can then be transmitted, e.g., to an automatic steering system, which enters the turning curves based on the start points and, based on the radian measure, travels along the turning curves in the correct direction, then reaches the start point of the new working track, thereby ensuring that the machine system is automatically driven along the planned headland track.

The machine system can be driven along the headland track fully automatically, as described above. In addition thereto, or for driving the machine system along the headland track manually or semi-automatically, the particular headland track is preferably displayed on a display device in a special "turning display mode" to the operator of the machine system. With a display of this type, it is possible to display the working track currently being driven on, planned "target working tracks", and planned headland tracks. It is also possible to emphasize the display of other working tracks, e.g., the next possible working track or working tracks with certain additional properties. Additional information can be provided for the working tracks, such as the track number, whether the track has a path marking, the length of the driving track, and further driving track properties that the operator has selected and entered. The following methods, properties or settings are options for the display orientation and scaling:

The display orientation is based on the vehicle orientation (continually or subdivided into fixed angular increments);

The display orientation is based on the current working tracks or the current headland track (continually or subdivided into fixed angular increments);

The display orientation is based on the planned driving track orientation depending on the deviation of the vehicle orientation;

The display orientation is based on cardinal points (which can be selected or entered, and fixed);

The scaling of the display is based on the working width of the machine system;

The scaling of the display is based on the length of the planned or proposed headland track;

The scaling of the display is based on the width of the bed that the machine system is currently working;

The scaling is based on the field size;

The scaling of the display is based on the position of other participants in a machine system, e.g., other machines in a team, or an unloading vehicle.

Preferably, the scaling is adjustable or manually changeable. A setting in a fixed grid is possible, in particular.

It is also possible to select, adjust, or specify various procedures for various driving functions.

A separate display for a turning display of this type can be located in the driver's cab of the machine system. It is also possible, however, to depict a turning display of this type on a display that is otherwise used for other displays, e.g., to depict an entire field. A display of this type can be switched to a turning display mode manually or in a preprogrammed manner. The display can be switched automatically, e.g., when so programmed, as soon as the end of a working track is detected or a planned headland area on a target route has been reached. A change in area of this type can be detected, e.g., when it is determined using sensors that the machine system is located at the end of a field of crops. The current position data can also be compared with cartographic data on the field that are stored in a memory device, and the display switches over as soon as the machine system approaches an outer edge of the field or the boundary of a subregion (the edge of a bed), or the like.

The length of time for which the turning display is displayed can also be coupled to certain areas of the field or defined or adjustable time periods, to sensor signals, to signals that are generated by the automatic steering system, or to other events.

Preferably, with a semi-automatic mode of the control system or the turning maneuver planning module, various possible headland tracks between a working track currently being driven along and a subsequent working track to be driven along are determined, and they are displayed to the operator for selection, e.g., in the turning display. The operator can then select one of these suggestions or acknowledge a planned default selection.

The present invention is explained below in greater detail based on the attached figures, with reference to exemplary embodiments. Further details and advantages of the present invention result therefrom. Components in the various figures that are identical are labeled with the same reference numerals.

DESCRIPTION OF THE PREFERRED EMBODIMENTS

Figure 1:
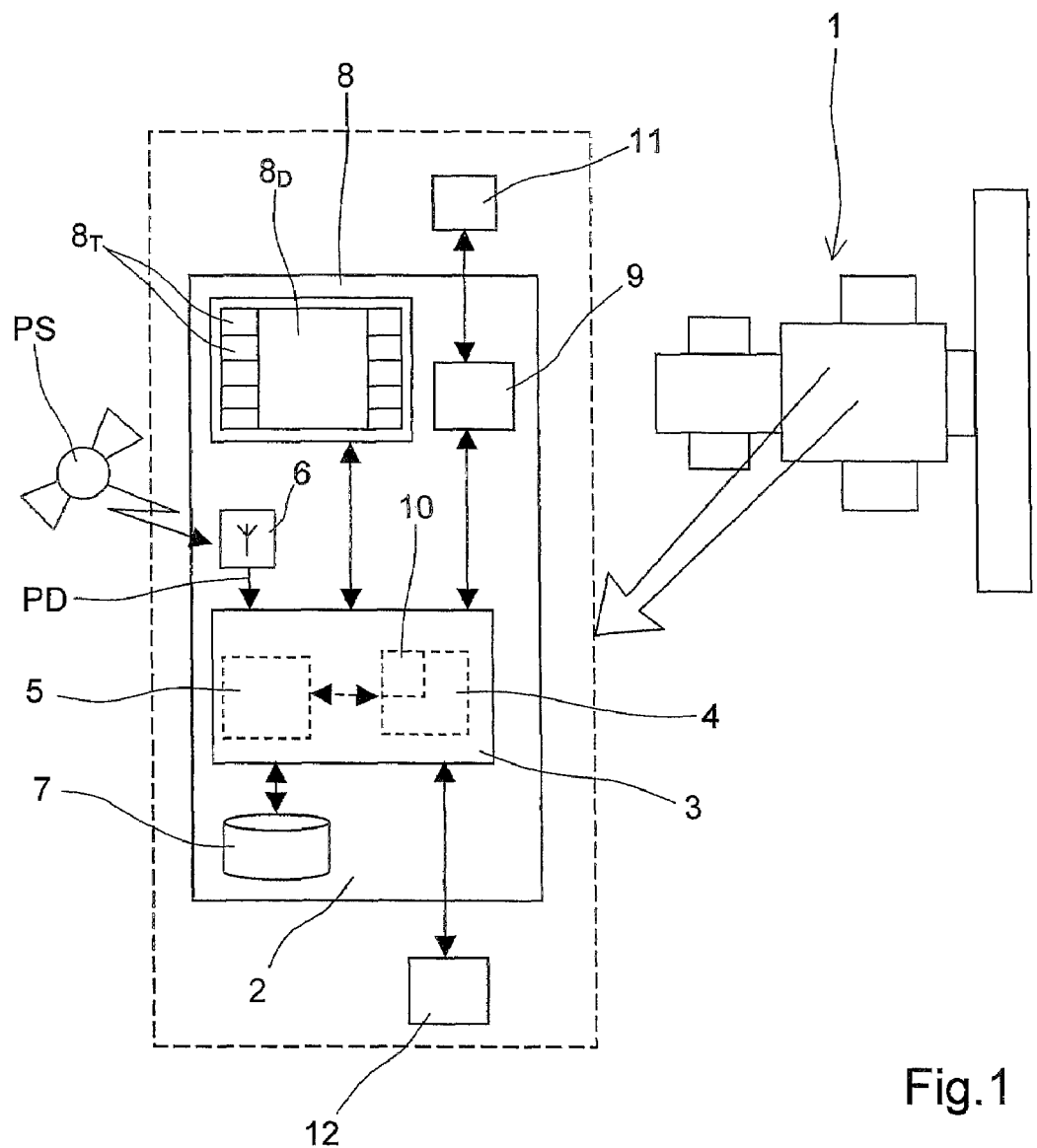
FIG. 1 is a schematic depiction of an agricultural machine system with an exemplary embodiment of an inventive control system.

The agricultural machine system depicted in FIG. 1 is a combine harvester 1 that includes an inventive control system 2. The general layout and mode of operation of a combine harvester 1 are known to one skilled in the art, as are suitable conventional control systems. Therefore, only those components of control system 2 that are required to explain the present invention are depicted schematically in FIG. 1.

The essential components of control system 2 include a position determination device 6, e.g., a GPS receiver, which receives GPS signals from suitable position satellites PS. This is preferably a GPS receiver that operates in a corrected, satellite-based system, e.g., with DGPS or the like, in order to determine position as exactly as possible, preferably to within a few centimeters.

Control system 2 also includes a processor 3, on which a route planning system 4 and a headland management system 5 are implemented in the form of software modules. The basic design and mode of operation of route planning systems of this type are made known, e.g., in EP 0 821 296 A1 and DE 10 2004 0720 242 A2. Reference is hereby made to the entire contents of these publications.

Route planning system 4 and headland management system 5 work together here, according to the present invention. In this case, therefore, a part of route planning system 4 is a turning maneuver planning module 10, which can be realized, e.g., as a subroutine of a route planning system 4. This turning maneuver planning module 10 is responsible for planning the headland tracks while the field is being worked and, to this extent, it works together with headland management system 5.

Headland tracks can be updated any time using turning maneuver planning module 10. That is, sequences of headland working steps that were initially specified, e.g., by headland management system 5, or that were learned with the aid of headland management system 5 can be adapted to the current headland track to be driven along. To this end, route planning system 4 and headland management system 5 are provided with current position data PD, among other data, from position determination device 6.

A memory device 7 serves to store planned routes with all of the working tracks and, optionally, headland tracks. The sequences of headland working steps that were learned or specified in any other manner can also be stored in memory device 7. The memory device can also contain all necessary cartographic data on the territory to be worked, and the machine parameters and crop parameters required for the planning, or other information required for the route planning, track guidance, and headland management system 5.

Instead of an on-board route planning system 4, it is also possible to use a route planning system located on a farm-based computer. In this case, the final route is transmitted to control system 2 of combine harvester 1. The final route can then be stored, e.g., in memory device 7. In this case, the route is preferably composed of the stated individual working tracks with start point and end point, the sequence in which these working tracks will be driven along, and, possibly, preplanned headland tracks. In order to allow updates to be carried out at any time while the field is being worked, control system 2 preferably also includes a suitable turning maneuver planning module 10 in this case.

Turning maneuver planning module 10 then serves—as described above—to update the headland tracks during operation, in order to change the originally planned sequence of working tracks to be driven along, or to deviate from the prescribed route for any other reason. e.g., due to unforeseen obstacles. As an alternative or in addition thereto, the machine system can also exchange data continually with the external route planning system, e.g., via radio.

Processor 3 is capable of controlling control modules for various working units 12, e.g., hydraulic pumps, valves or the like, which are depicted here schematically in a block diagram. Working units 12 are controlled to carry out a sequence of headland working steps, e.g., based on the specifications of headland management system 5.

Processor 3 is also coupled with an automatic steering system 9, thereby allowing machine system 1 to automatically drive along the working tracks and headland tracks provided by route planning system 4 and turning maneuver planning module 10. To this end, automatic steering system 9 interacts with driving control units 11 such as wheel steering, clutch, brakes, etc., which are typically provided on machine system 1. For simplicity, driving control units 11 are depicted here as an individual block.

Control system 2 also includes a user interface 8 that is coupled with processor 3. In this case, user interface 8 is composed of a touch display with a display area $8_D$ and buttons $8_T$ located on the side thereof. When the operator touches display 8 in the region of buttons $8_T$—which are depicted virtually—he can actuate certain entries or carry out certain actions.

Figure 2:
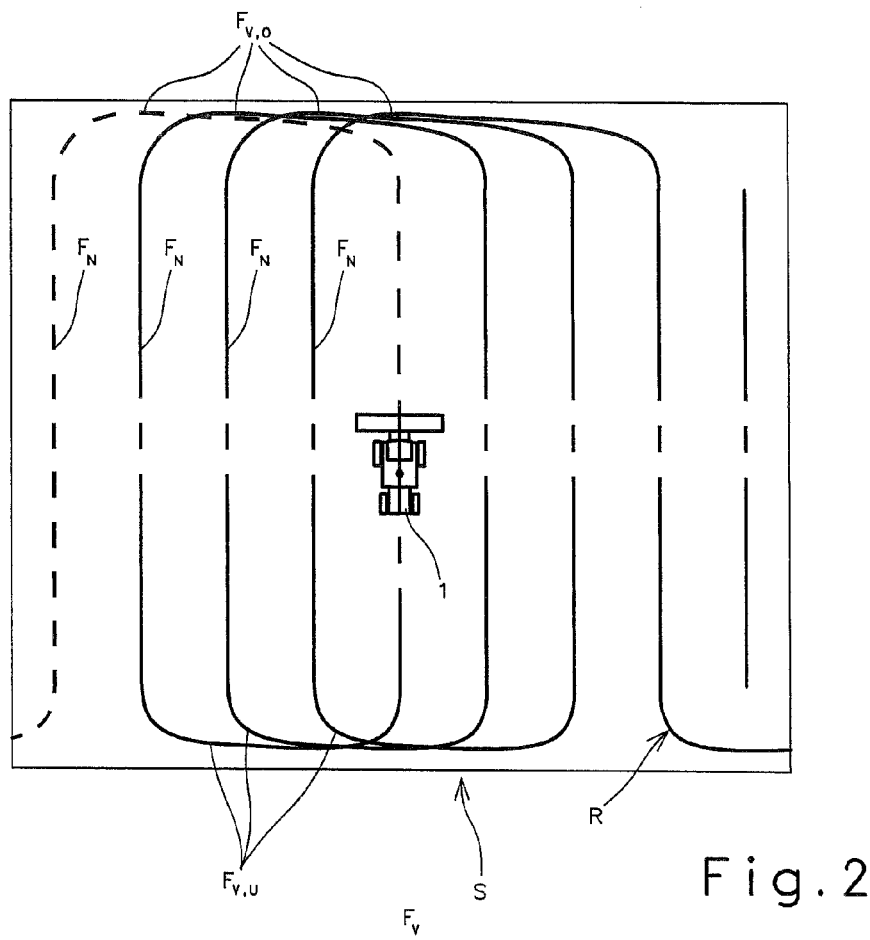
FIG. 2 is a depiction of a section of a field with several working tracks and several headland tracks.

The mode of operation of a machine system 1 with a control system 2 of this type will be described below with reference to FIGS. 2 through 10:

FIG. 2 shows several working tracks $F_N$ on a field S, and headland tracks $F_{V,O}$, $F_{V,U}$, which a combine harvester 1 must drive along in order to travel from one working track $F_N$ to the next working track $F_N$. In this case, the working strategy is chosen such that, when combine harvester 1 performs a turning maneuver, it alternately bypasses over three driving tracks (in FIG. 2, upper headland tracks $F_{V,O}$) and then two working tracks $F_N$ (in FIG. 2, lower headland tracks $F_{V,U}$). When combine harvester 1 drives along planned route R, it must therefore alternately drive along headland tracks $F_{V,O}$, $F_{V,U}$, which have different lengths.

Based on this example, it is clear that a headland management system, with which the various working steps in a sequence of headland working steps take place in a fixed time sequence or according to defined path sections that have been driven along, is not particularly well suited for purposes such as this. In the simplest case, a typical sequence of headland working steps for a combine harvester 1 could be that, when combine harvester 1 is driven off of the field, i.e, at the end of a working track $F_N$, the engine speed is reduced and then the cutting mechanism is raised. To then drive along the headland track, a different gear is selected and the entire process is carried out again, in reverse order, before the combine harvester enters subsequent working track $F_N$.

If a sequence of headland working steps of this type would be learned on one of the upper headland tracks $F_{V,O}$, the length of time for lower headland tracks $F_{V,U}$ at the lower edge of the field would be too long. As a result, e.g., the cutting mechanism of combine harvester 1 would not be lowered yet when combine harvester 1 enters subsequent working track $F_N$. If, conversely, the sequence of headland working steps would be learned on a headland track $F_{V,U}$ at the lower end of the field, the individual working steps for headland tracks $F_{V,O}$ on the upper edge of the field would be carried out too quickly, i.e., the cutting mechanism would be lowered much too soon, for example, before combine harvester 1 enters subsequent working track $F_N$. This could result in unfavorable situations, including accidents, in the headland area.

With a route of the type depicted in FIG. 2 and with a field S with straight edges, this problem could be solved by learning two different sequences of headland working steps for headland tracks $F_{V,O}$, $F_{V,U}$ at the upper and lower edges of the field, with the driver selecting the correct sequence of headland working steps at the end of a working track $F_N$ by pressing a start button.

Figure 3:
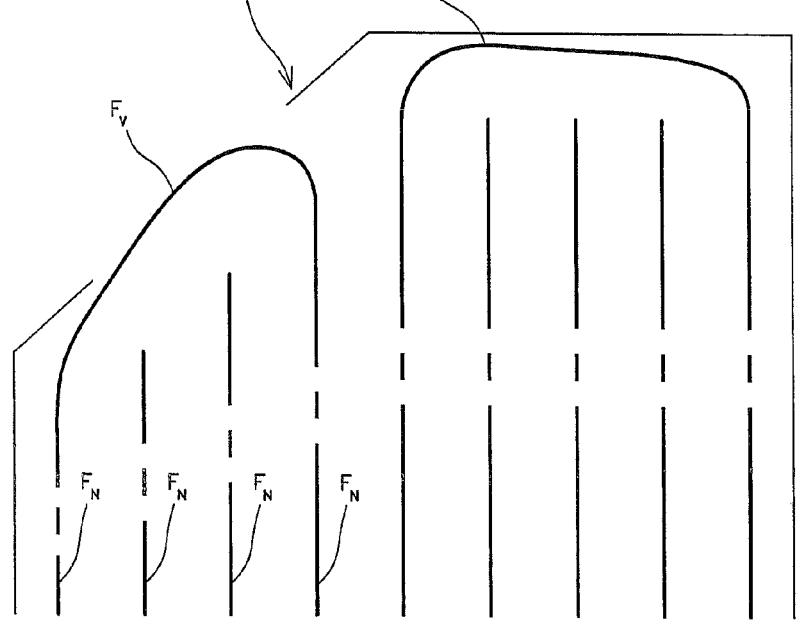
FIG. 3 is a depiction of a section of a field with several working tracks and two different headland tracks.
Figure 4:
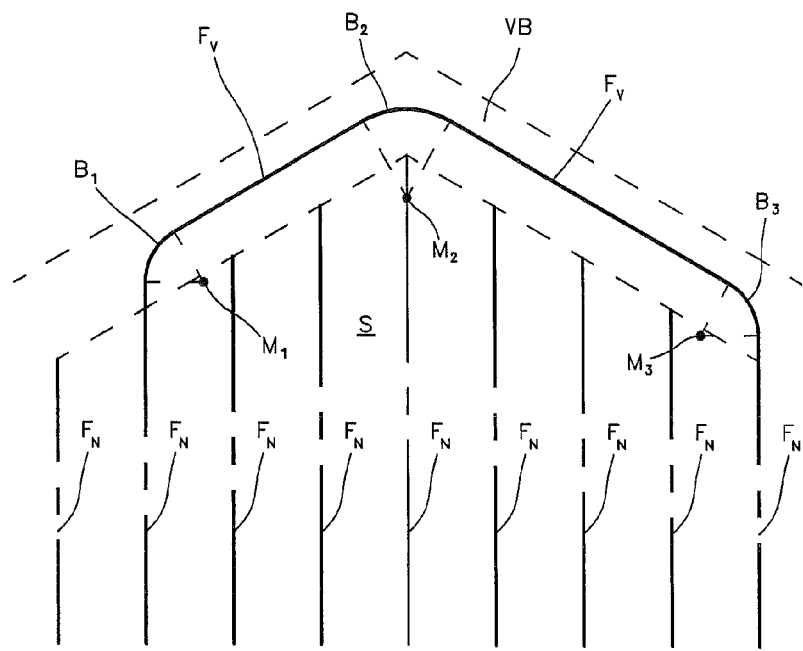
FIG. 4 is a depiction of a section of a field with several working tracks and one headland track.

This solution is no longer suitable, however, when the outer edges of field S or the field surface are not straight lines, as shown in FIGS. 3 and 4. These figures show how, when working tracks $F_N$ are bypassed, headland tracks $F_V$ must have different paths, so that the machine system can travel along the edge of the field in headland area VB from the previous working track to the next working track.

For this reason, with the control system depicted in FIG. 1, headland management system 5 interacts with a turning maneuver planning module WMP 10 in a suitable manner so that the sequence of headland working steps is actually synchronized with headland track $F_V$ that will actually be driven along, regardless of what headland track $F_V$ actually looks like. In terms of this synchronization, the decisive factor is that the individual working steps be carried out at the appropriate working points after exiting a working track—or in the reverse sequence of working steps—in timely fashion but not too soon before entering the new working track.

To this end, the distance and length of time that are probably available before the new driving track is entered are calculated based on the current headland track to be driven along, i.e., depending on the current position of the machine system and the start point and the direction of the new working track, and the headland management system adapts an originally specified sequence of headland working steps accordingly. This originally specified sequence of working steps can be learned in a learning mode, e.g., by driving through a turning maneuver, as is the case with conventional systems. It is also possible, however, to manually enter this sequence of working steps in advance, e.g., on a farm-based computer, or to plan it in advance and to then transmit it to the headland management system.

When the headland track is being driven along, the current position of the machine system is checked regularly and a calculation is carried out to determine how much distance remains until the next driving track is entered, and how much time is available for this. If any relevant deviations from the planned data occur, the headland management system immediately modifies the sequence of headland working steps such that the sequence of the individual working steps is synchronized with the current driving track again, to the extent this is possible. To this end, the order of working steps in the sequence of working steps can be rearranged or left out entirely, if possible.

Figure 5:
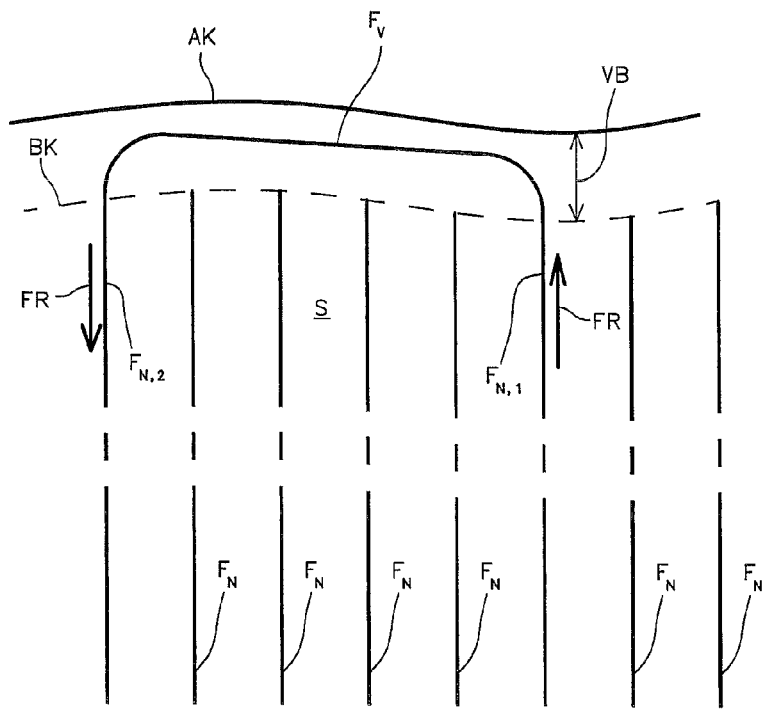
FIG. 5 is a depiction of a section of a field with several working tracks and one headland track.

In order to be able to react to all events in a flexible manner, it is possible with control system 2—as described above—to reorganize a route R at any time, particularly by spontaneously changing the sequence in which individual working tracks $F_N$ are to be entered. In this case, new headland tracks $F_V$ must be planned accordingly, so that individual working tracks $F_N$ can be entered in the desired sequence. As shown in FIG. 5, this requires that control system 2, i.e., turning maneuver planning module 10, know headland area VB that is available. Headland area VB is defined, e.g., for a harvesting machine, by outer edge AK of field S and field edge BK. The data for headland area VB are stored, e.g., in a map in memory device 7.

Further information that is required about headland area VB includes information about obstacles such as telephone poles or hedges or the like, specified blocked areas and safety areas in which automatic driving is not allowed. Safety areas of this type can be headland areas adjacent to public roads, and areas in which a GPS signal cannot be received well, due, e.g., to a thick woods, and the position system is therefore unable to function with sufficient accuracy or reliability. Based on these data—as will be described below in greater detail—a headland track $F_V$ can be determined in order to travel reliably through the headland area in a direction of travel FR from an "old" working track $F_{N,1}$ that is currently being driven along, into the next, "new" working track $F_{N,2}$ to be driven along.

Figure 6A:
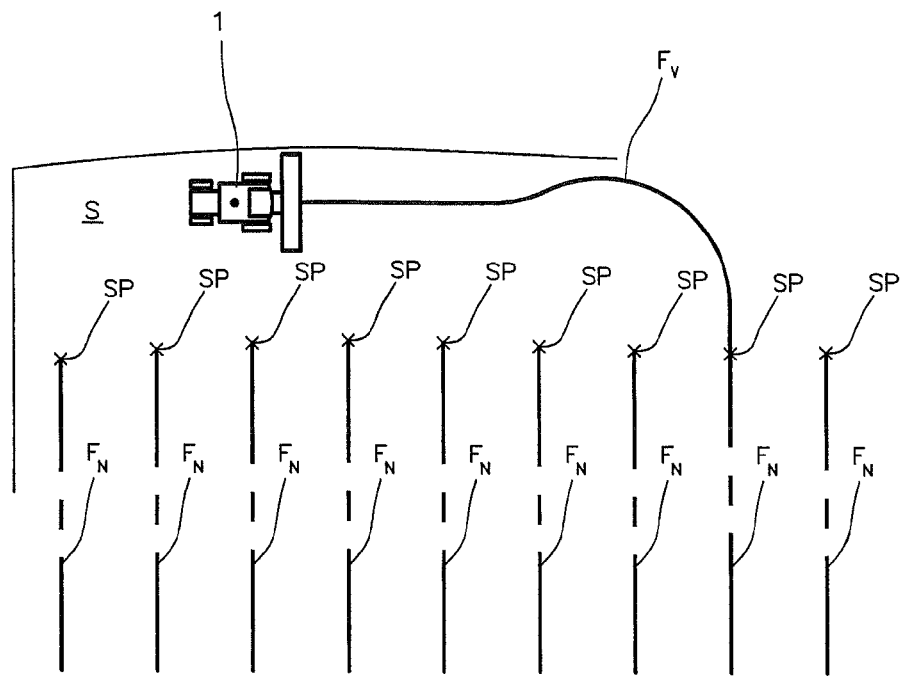
FIGS. 6a and 6b are a schematic depiction of a section of a field with several working tracks and two different variants of headland tracks, in order to merge into a working track.
Figure 6B:
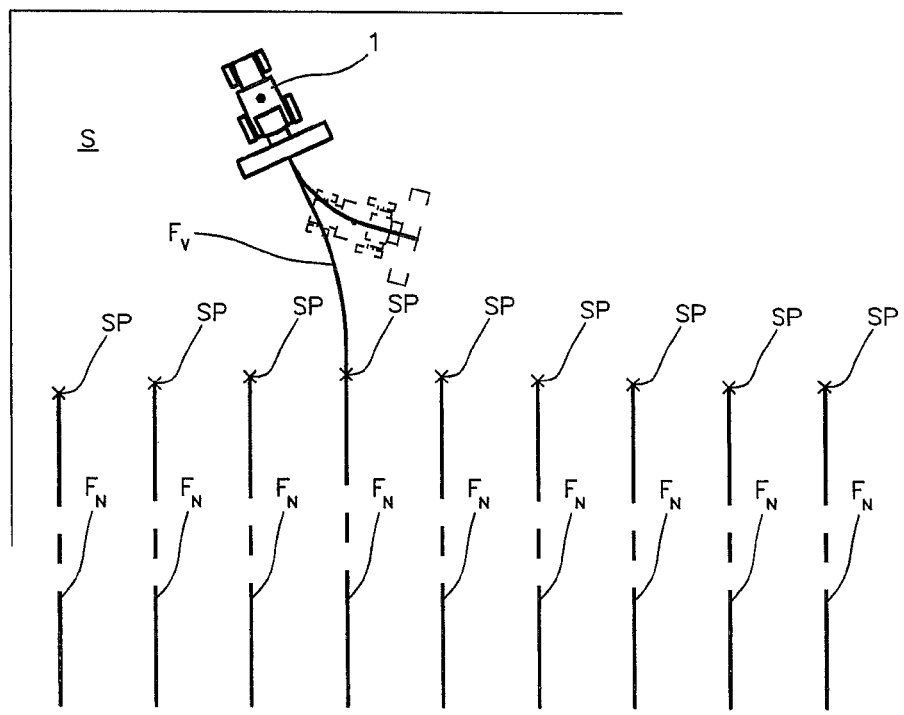

In planning headland track $F_V$, particular attention should be paid to ensuring that the machine system merges correctly into particular working track $F_{N,1}$ to be driven along, i.e., that it does not enter it at an angle, for example. Depending on the turning radius of the machine system, a somewhat more complex headland track $F_V$ can therefore be selected for the entry into new driving track $F_N$. As an example, two possibilities for entering a working track $F_N$ at the correct entry angle are shown in FIGS. 6a and 6b. In each case, only one section of a field S is shown, with part of a row of working tracks $F_N$. Start points SP on individual working tracks $F_N$ are also indicated. To ensure that machine system 1 merges correctly into particular working track $F_N$, machine system 1 must arrive at start point SP of particular working track $F_N$ with the correct orientation.

FIG. 6a shows a first possibility for ensuring this; headland track $F_V$ is selected such that machine system 1 makes another pass, i.e., it travels along a curve with a greater turning radius, in a timely manner before start point SP of driving track $F_N$ into which machine system 1 intends to merge.

FIG. 6b shows another variant, with which headland track $F_V$ is selected such that machine system 1 first drives out—in the direction of travel along the headland area—parallel to the edge of the field slightly past start point SP of particular working track $F_N$ and then travels along a curve, in order to position itself appropriately so it can merge into driving track $F_N$.

The variant that is selected usually depends on the spacial circumstances in the headland area. Preferably, a preferred, optimal route and one or more alternatives are proposed to the operator of the machine system, and the operator can then acknowledge the preferred, optimal route or select an alternative, if this appears to be more suitable to him. As described above, the headland management system then adapts a sequence of headland working steps to the headland track that the operator acknowledged or selected.

Based on FIGS. 7 through 10, it becomes clear which parameters are required to define a headland track $F_V$. In this case, the machine system must travel from a previous working track $F_{N,1}$ to a subsequent working track $F_{N,2}$ and merge into it correctly. Working tracks $F_{N,1}$, $F_{N,2}$ shown here have been shortened considerably. The only data that the control system needs to define working tracks $F_{N,1}$, $F_{N,2}$ are start points SP and end points EP and direction of travel FR in which the machine system should move. Via direction of travel FR, it is determined which point at the end of a working track $F_{N,1}$, $F_{N,2}$ is actual start point SP and which is end point EP. This property can therefore be reversed. When direction of travel FR is known, the control system only requires the coordinates of the points.

Entire turnaround path $F_V$ is then composed of entry and exit paths $L_1$, $L_2$, in which machine system 1 is still moving in a straight line away from end point EP of old working track $F_{N,1}$ and moves toward start point SP of new working track $F_{N,2}$, in order to drive straight off of field and merge straight into new working track $F_{N,2}$. Entry and exit paths $L_1$, $L_2$ can have different lengths, depending on the machine system. Connecting entry and exit paths $L_1$, $L_2$ is actual turnaround path WST, along which the orientation of the machine system is changed. The decisive parameters for defining turnaround path WST include turnaround path start point WSS and turnabout path end point WSE. In this case as well, the orientation specified by direction of travel FR is essential, as explained above.

Figure 8:
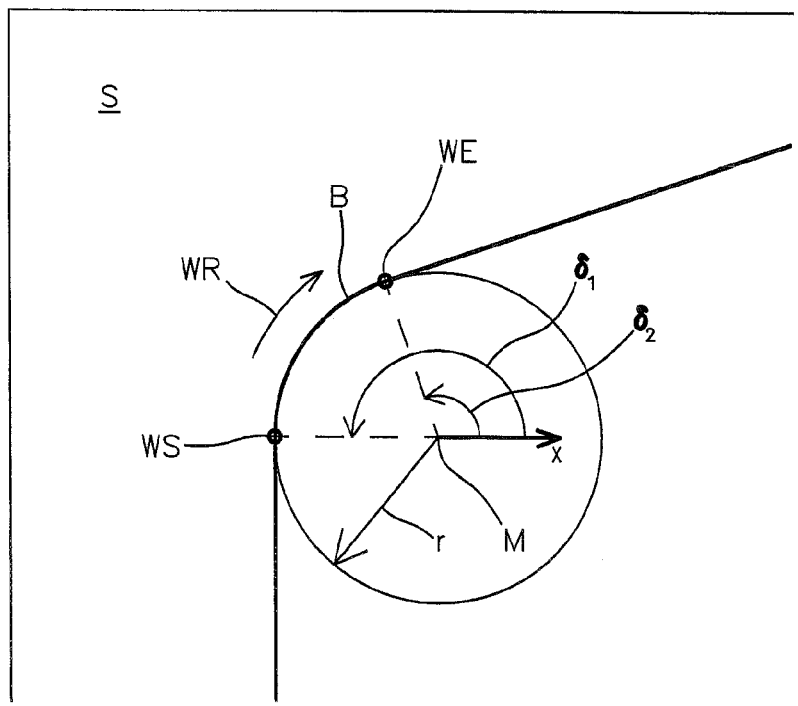
FIG. 8 is a schematic depiction of the position data required to define a turning curve.

Actual turnaround path WST can then be defined by individual turning curves. A turning curve B of this type is depicted in FIG. 8; it can be defined, e.g., by the following parameters, such as curve center M and turning radius r of turning curve B. One more radian measure is required, i.e., the angular segment of particular turning curve B must be determined, in order to thereby determine turn start point WS and turn end point WE of turning curve B. In the exemplary embodiment depicted in FIG. 8, this takes place by specifying two angles $\delta_1$, $\delta_2$. First angle $\delta_1$ is the angle between a normal vector x and the vector from curve center M to curve start point WS. Second angle $\delta_2$ is the angle between normal vector x and the vector from curve center M to turn end point WE. With this exemplary embodiment, turn start point WS of curve B and turn end point WE are defined using polar coordinates based on curve center M. It is also possible to define turn start point WS and turn end point WE using other coordinates. Direction of travel along curve WR must also be known, i.e., in which direction of the curve the machine system drives.

Figure 9:
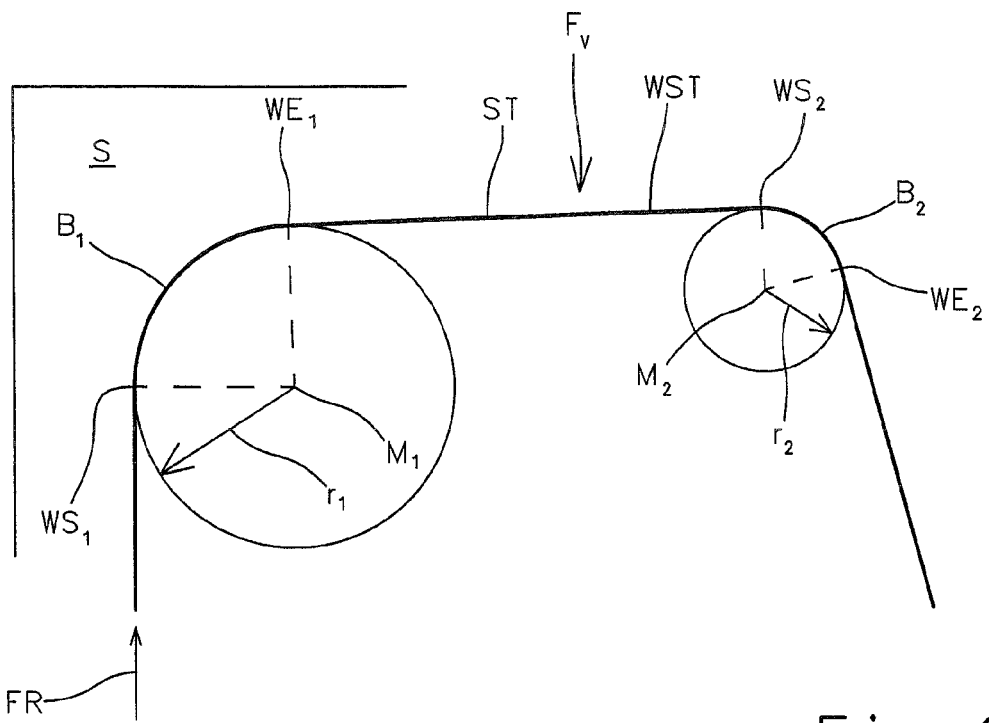
FIG. 9 is an example of an 180° headland track with no reverse-direction driving, defined with the aid of two turning curves.
Figure 10:
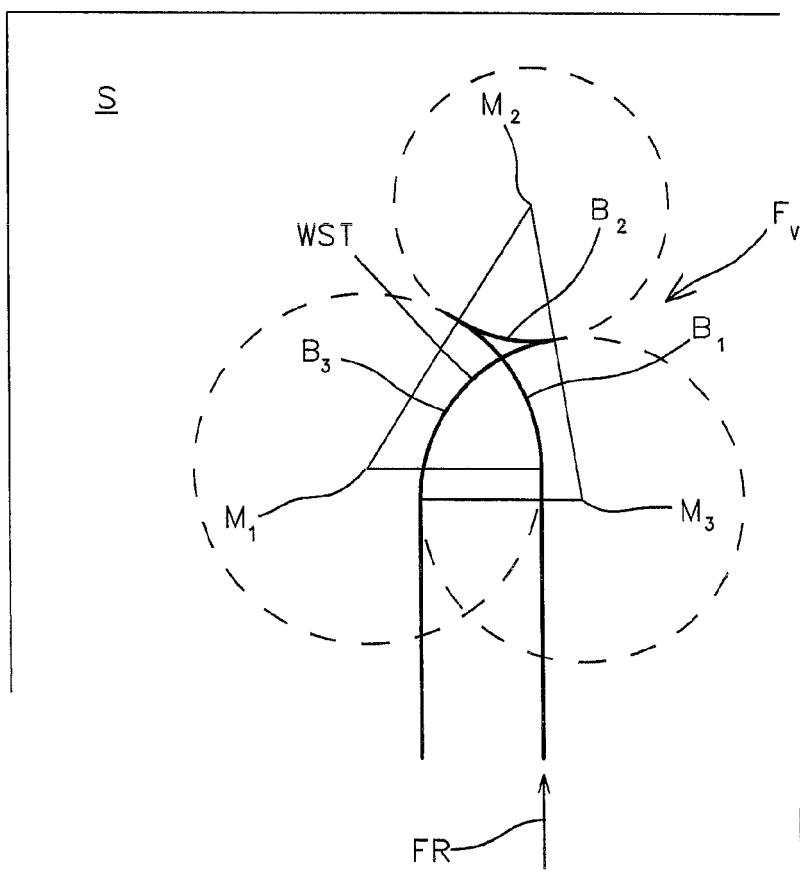
FIG. 10 is an example of an 180° headland track with reverse-direction driving, defined with the aid of three turning curves.

FIGS. 9 and 10 show how entire turn paths WST and headland tracks $F_V$ can be defined using turning curves B of this type.

Figure 7:
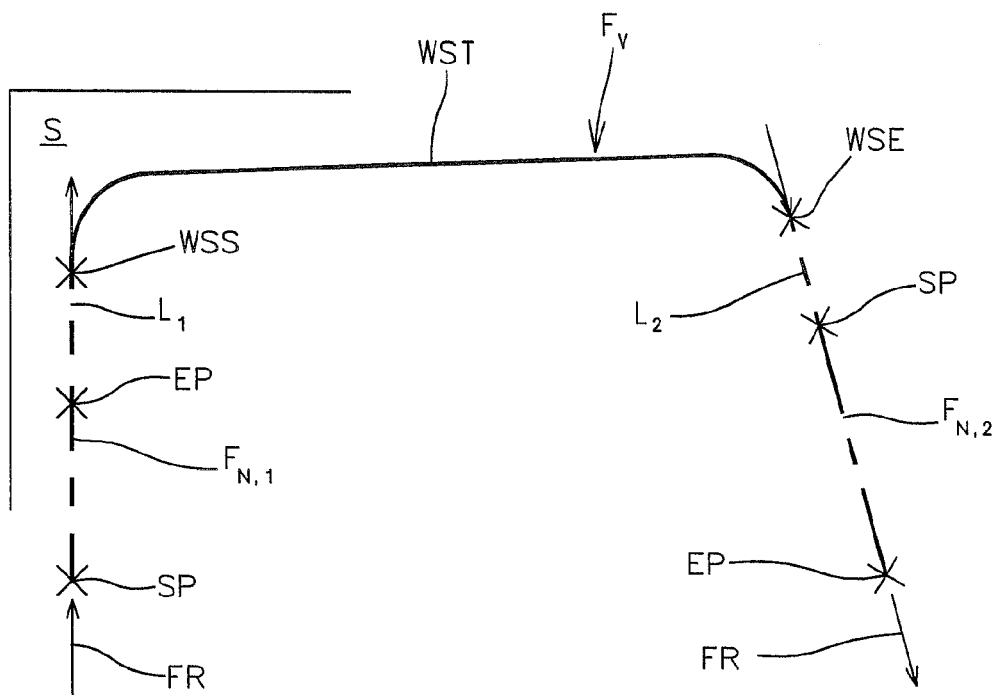
FIG. 7 is a depiction of the layout of a headland track between two working tracks and the position data required therefor.

FIG. 9 shows a simple 180° turn, in which case the machine system travels along the curve in one stretch, i.e., without traveling in the reverse direction, as is also depicted in FIG. 7. In this case, the only data required are the parameters of turning curves $B_1$, $B_2$, i.e., their curve centers $M_1$, $M_2$ and radii $r_1$, $r_2$, and associated turn start points $WS_1$, $WS_2$ and turn end points $WE_1$, $WE_2$. Path section ST between turning curves $B_1$, $B_2$ and the entry and exit tracks into working tracks (not shown here) result from the fact that turn start points $WS_1$, $WS_2$ and turn end points $WE_1$, $WE_2$ of curves $B_1$, $B_2$, and the end points of the working tracks and direction of travel FR are known. It is therefore sufficient when turning maneuver planning module 10 defines the individual data on turning curves $B_1$, $B_2$ and start and end points EP of the working tracks involved, and direction of travel FR, and makes these data available to the automatic steering system.

FIG. 10 shows a further example of how a headland track $F_V$ is defined using three turning curves $B_1$, $B_2$, $B_3$ with centers $M_1$, $M_2$, $M_3$ for an 180° turn with travel in the reverse direction. In this case, the machine system first drives along first curve $B_1$ in the forward direction out of the previous working track, travels back along turning curve $B_2$, and then drives along third turning curve $B_3$ back into the new working track that is located directly next to the old working track. A comparison with FIG. 9 reveals that much less space is required in this case than when the machine system enters new working track $F_N$ in one pass, i.e., without traveling in the reverse direction. Travel in the reverse direction always requires much more time, so careful consideration must be given to deciding which turning maneuver is more advantageous.

FIG. 4 also shows how, e.g., with three turning curves $B_1$, $B_2$, $B_3$, it is also possible to easily and reliably define headland tracks $F_V$ in headland areas VB with complicated cartographic dimensions.

Using the inventive dynamic updating of the sequence of headland working steps depending on the specific course of a current headland track, it is possible to always carry out the individual working steps in a manner such that they are synchronized with the headland track. Manual activities to be carried out by the operator can therefore be limited to a minimum. For safety reasons, the system is also designed, of course, such that the operator can manually override the fully automatic control at any time.

Finally, it is pointed out once more that the machine systems and control systems shown in the figures, and the specific methods explained in context therewith are merely exemplary embodiments and they could be modified in a variety of ways by one skilled in the art, without leaving the framework of the present invention. In interest of completeness, it is also pointed out that the use of the indefinite article "a" does not preclude the fact that the particular feature can also occur in plurality.

It will be understood that each of the elements described above, or two or more together, may also find a useful application in other types of method and systems constructions differing from the type described above.

While the invention has been illustrated and described as embodied in a method for controlling an agricultural machine system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the following claims.

The invention claimed is:

1. A method for controlling an agricultural machine system while it works a territory (S), comprising the steps of creating a route (R) for the machine system, which includes working tracks ($F_N$) along which the machine system is driven while the territory (S) is being worked, and which includes headland tracks ($F_V$), along which the machine system is driven when it travels from one working track ($F_N$) to the next working track ($F_N$); automatically processing by the machine system a sequence of headland working steps at the end of one working track ($F_N$) and/or while a subsequent headland track ($F_V$) is being driven along, and/or at the beginning of a subsequent working track ($F_N$); and updating and carrying out dynamically the sequence of headland working steps depending on the current position of the machine system and depending on the next working track ($F_N$) to be driven along.

2. A method as defined in claim 1,
wherein,
depending on
   the working track ($F_N$) that is currently being driven along,
   the next working track ($F_N$) to be driven along,
   the geographical data of a headland area (V),
   and certain machine parameters of the agricultural machine system (1), determining a headland track ($F_V$) between the working track ($F_N$) currently being driven along and the next working track ($F_N$) to be driven along such that the machine system merges into the next working track ($F_N$) to be driven along in an optimal manner.

3. A method as defined in claim 2,
wherein,
while the headland track ($F_V$) is being driven along, updating it dynamically depending on the current position of the machine system.

4. A method as defined in claim 1,
wherein,
when the route (R) for the machine system is being created, updating the working tracks ($F_N$) and the sequence in which the working tracks ($F_N$) will be driven along depending on certain machine parameters and/or depending on the course of possible headland tracks ($F_V$) between the working tracks.

5. A method as defined in claim 4,
wherein,
during travel along a working track ($F_N$), updating dynamically the sequence in which the subsequent working tracks ($F_N$) will be driven along.

6. A method as defined in claim 2, further comprising including in the machine parameters that are taken into account in the determination of the working tracks ($F_N$) and/or the sequence of working tracks ($F_N$) and/or the headland tracks ($F_V$), a working width and/or a turning radius of the machine system.

7. A method as defined in claim 2, further comprising generating a headland track ($F_V$) between the working track ($F_N$) currently being driven along and the next working track ($F_N$) to be driven along using individual turning radii (B, $B_1$, $B_2$, $B_3$), each of which is defined by the following parameters:
   a turning radius center (M, $M_1$, $M_2$, $M_3$),
   a turning radius (r),
   a radian measure ($\delta_1$, $\delta_2$),
   a direction of travel (WR) along the turning curve (B, $B_1$, $B_2$, $B_3$),
   information about subsequent turning curves ($B_1$, $B_2$, $B_3$).

8. A method as defined in claim 1, further comprising driving the machine system along the headland track ($F_V$) in a fully automatic manner.

9. A method as defined in claim 1, further comprising displaying the particular headland track ($F_V$) to an operator of the machine system (1) on a display device ($8_D$) in a turning display mode so he can drive along a headland track ($F_V$).

10. Automatic control system for controlling an agricultural machine system on a territory (S) to be worked, comprising a position data determination device for automatically detecting current position data (PD) about the machine system; a route planning system for creating a route (R) for the machine system, which includes working tracks ($F_N$) along which the machine system is driven while the territory (S) is being worked, and which includes headland tracks ($F_V$), along which the machine system is driven when it travels from one working track ($F_N$) to the next working track ($F_N$); a headland management system which controls the machine system such that a sequence of headland working steps is carried out automatically at the end of a working track ($F_N$) and/or while a subsequent headland track ($F_V$) is being driven along, and/or at the beginning of a subsequent driving track ($F_N$); the headland management system is designed such that the sequence of headland working steps is updated and carried out dynamically depending on the current position of the machine system and depending on the next working track ($F_N$) to be driven along.

* * * * *